United States Patent [19]

Contal et al.

[11] 4,383,650

[45] May 17, 1983

[54] METHOD AND APPARATUS FOR GRINDING RUBBER

[75] Inventors: François Contal, Grenoble; Jacques Maissin, Echirolles, both of France

[73] Assignee: L'Air Liquide, Societe Anonyme pour l'Etude et l'Exploitation des Procedes Georges Claude, Paris, France

[21] Appl. No.: 175,676

[22] Filed: Aug. 5, 1980

[30] Foreign Application Priority Data

Aug. 21, 1979 [FR] France ............................... 79 21032

[51] Int. Cl.³ .............................................. B02C 7/17
[52] U.S. Cl. .................................. 241/66; 241/261.3; 241/DIG. 37
[58] Field of Search .................... 241/16, 17, 18, 23, 241/28, 38, 65, 66, 67, 261.2, 261.3, DIG. 31, DIG. 37

[56] References Cited

U.S. PATENT DOCUMENTS

| | | | |
|---|---|---|---|
| 2,211,518 | 8/1940 | Scherbaum | 241/66 |
| 3,584,799 | 6/1971 | Feder | 241/66 X |
| 3,718,284 | 2/1973 | Richardson | 241/DIG. 37 X |
| 4,102,503 | 7/1978 | Meinass | 241/DIG. 37 X |
| 4,253,613 | 3/1981 | Reinhall | 241/28 X |

FOREIGN PATENT DOCUMENTS 798339 3/1936 France .
2385511 3/1978 France .

Primary Examiner—Mark Rosenbaum
Attorney, Agent, or Firm—Young & Thompson

[57] ABSTRACT

This invention relates to a method and apparatus for grinding with two toothed plates operating face to face, one of which plates is fixed and the other of which is rotated by a shaft, with an axial supply of material to be ground and peripheral evacuation of the ground products. Chambers are provided for circulating of cooling water in contact both with the fixed plate and with the rotatable plate. At an intermediate radial point of the plates, a liquid nitrogen injector which enables reduction of the temperature of the product during treatment and making the grinding zone inert is fitted. The invention is applied to the grinding of rubber.

4 Claims, 2 Drawing Figures

METHOD AND APPARATUS FOR GRINDING RUBBER

BACKGROUND OF THE INVENTION

The present invention relates to the processing of vulcanised rubber which, with the intention of a regeneration for a new vulcanization operation or other utilization, is required to be crumbled by grinding into relatively fine particles.

Grinding mills with two toothed plates which work together face to face, are already known, one face of which is fixed and the other is driven in rotation, with a central supply across the said fixed plate, of material to be ground and peripheral removal of the ground products. In such mills, a cooling fluid, generally air, is injected between the two plates and in an intermediate radial position, by means of at least one injector which passes through the fixed plate. This type of grinding device can theoretically be used to grind rubber but experience shows that in certain grinding areas overheating occurs which is prejudicial to the good chemical and physical behavior of the product thus processed, and it has been confirmed, through experience, that the loss of air injected in situ between the plates cannot in any case be sufficient to reduce the overheating in question since this loss is necessarily very limited.

One object of the invention is to provide a method for grinding of the above-mentioned type, in which this disadvantage is minimized or substantially eliminated and where the temperature of the rubber during its passage through the grinder does not undergo any abnormal increase.

Another object of the invention is to provide a method of grinding where the disadvantages associated with the presence of oxygen in the air or of ozone formed at the grinding level are avoided.

SUMMARY OF THE INVENTION

Accordingly, in a process or apparatus of the kind hereinabove set forth, the invention consists in using liquid nitrogen as the cooling fluid, which nitrogen vaporizes and runs substantially radially towards the downstream direction.

A liquid nitrogen injector means is radially positioned in a sufficiently precise manner for the nitrogen vapours which occur at the level of injection to be substantially directed radially downward in co-current towards the periphery of the grinder to accompany the product during the end of processing and to avoid too pronounced heating thereof. To this extent not only the desired effect of a reduced increased in temperature of the rubber, which makes the operation quite realizable without serious deterioration of the product, but also inertness of the rubber is obtained during grinding which avoids any oxidation as was produced previously with the oxygen in the air. It is necessary to note that liquid nitrogen has already been used to grind elastic materials but this method of operation was greatly different in the sense that the liquid nitrogen was basically used to freeze the product at a very low temperature of fragilization. This is not the case with the present invention where basically an avoidance of any increase in temperature which could be prejudicial to the quality of the rubber processed is being sought.

The invention also consists in grinding apparatus of the kind hereinabove set forth, for practicing the method according to the invention, which apparatus includes a liquid nitrogen injector that comprises a tube surrounded by a thermal insulating sleeve radially spaced therefrom.

In the case where the fixed plate is associated with an annular chamber for cooling by water circulation, this liquid nitrogen injector goes through the cooling chamber and is mounted so as to be sealed by its thermal insulation sleeve on the wall facing the chamber and the plate.

BRIEF DESCRIPTION OF THE DRAWINGS

In order that the invention may be more clearly understood, reference will now be made to the accompanying drawings, which show certain embodiments thereof by way of example, and in which.

DETAILED DESCRIPTION OF PREFERRED EMBODIMENT

Figure 1:
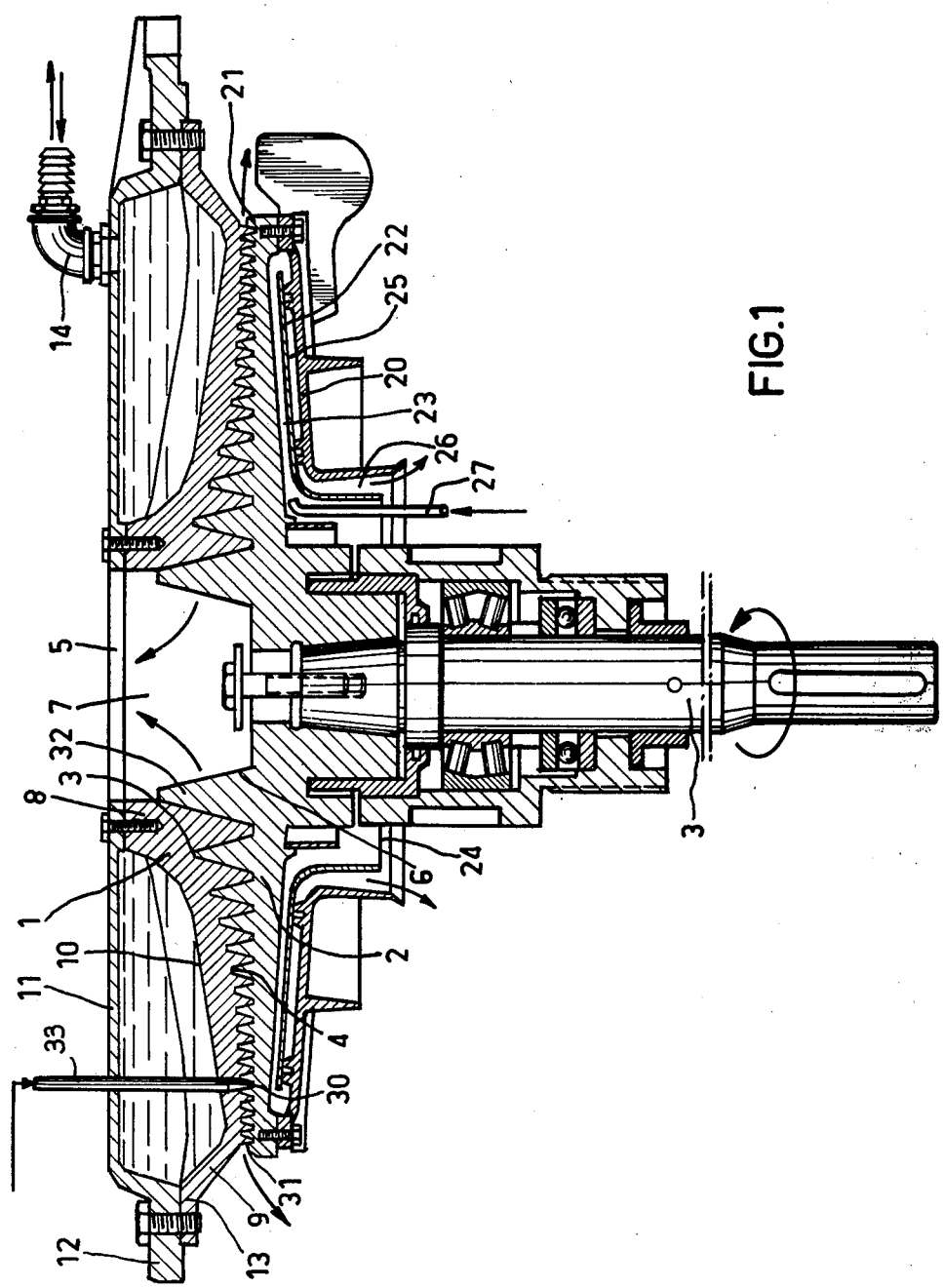
FIG. 1 is an axial section through grinding apparatus according to the invention.

Referring now to the drawings, grinding apparatus according to the invention comprises a fixed plate 1 which is integral with or fixed to a casing (not shown) and a rotating plate 2 driven in rotation by a shaft 3, the motor for which also has not been shown. The two fixed and rotating plates 1 and 2 have toothed annuli, respectively shown at 3 and 4, which are each mounted so that the tips of one set of teeth penetrate closely into the interstitial space between the teeth of the other plate. The fixed plate 1 has a central gap 5 facing a large equally axial protrusion in the rotating plate 2. The axial gap 5 and the axial protrusion 6 serve as an introduction chamber 7 for the material to be ground, i.e. the rubber divided into large pieces.

Means for water refrigeration are arranged on either side of the fixed and rotating plates 1 and 2 and two of these means are explained in detail hereinafter.

Above the fixed plate 1, which has a very thick axial part 8 and a thin peripheral part 9, is arranged a chamber which is delimited by the upper face 10 of the fixed plate 1 and by an end plate 11 which is closed by its peripheral rim 12 on a peripheral rim 13 of the fixed plate 1. A double pipe 14 for supplying and evacuating the cooling water is arranged in the end plate 11.

Also below the rotating plate 2 is arranged, integrally therewith or fixed thereto, an end plate 20 tightly sealed at the periphery of the peripheral ring 21 of the rotating plate 2. This plate 20 has, on its inside, a screen or cover 22 enabling a radially divergent passage 23 to be made which opens outward via an opening 25, and a radially convergent passage 24 to be made which opens outward via opening 26. Through the opening 24 and partly in passage 23 is disposed a fixed water projection pipe 27, the upper end of which is radially oriented so that the cooling water projected by the said pipe 27 can run under the effect of centrifugal force first of all in radially divergent manner in the passage 23 and then again in radially converging manner in the passage 25 to pass out and evacuate through the opening 26.

Figure 2:
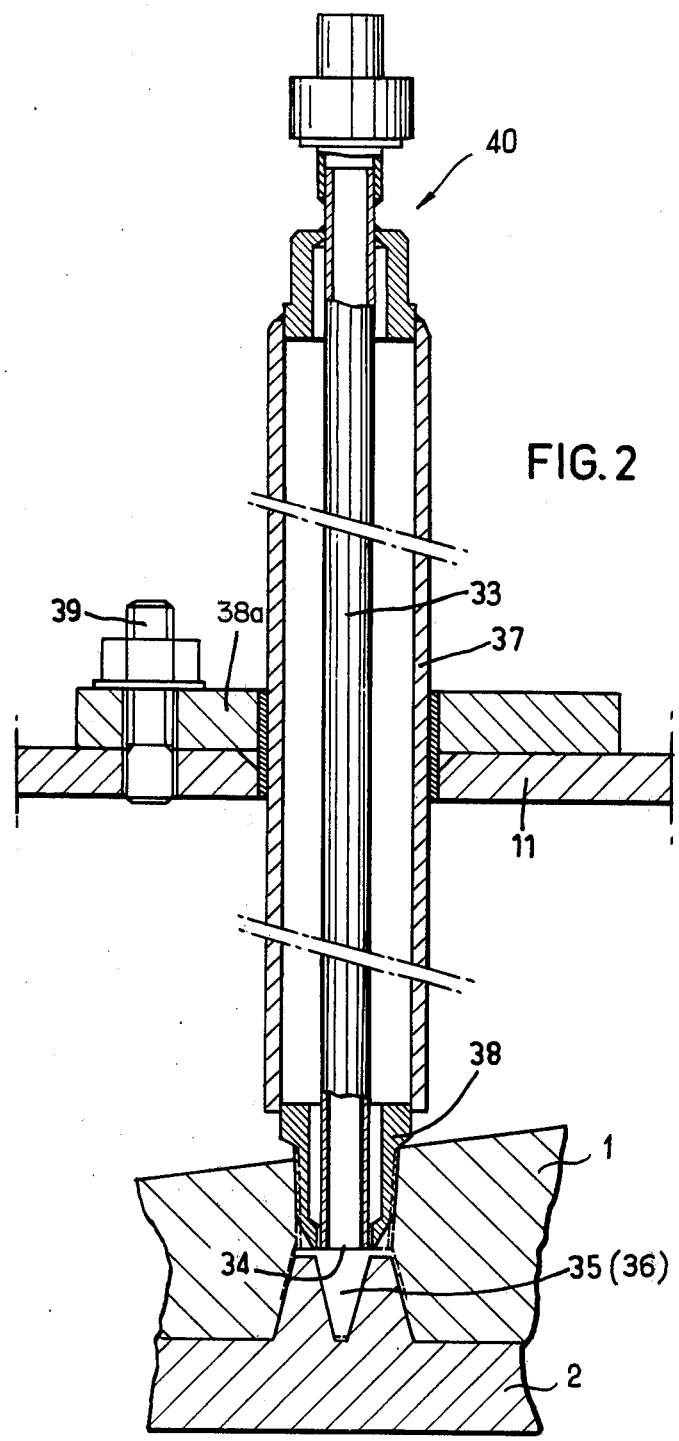
FIG. 2 is a longitudinal section, on an enlarged scale, of an injector according to the invention.

Moreover, a liquid nitrogen injector is arranged in an area 30 which is situated at a distance peripherally outside the exterior toothed annulus 31 and from the interior toothed annulus 32, this injector being in the form of a tube 33 which is fitted with a connecting piece 40 (FIG. 2) to a source of liquid nitrogen which is not shown and which opens out at 34 into the interstitial space between two teeth 35 and 36 of the toothed annulus of the fixed plate 1.

The liquid nitrogen supply tube 33 is surrounded by a thermal insulating sleeve 37 with a gap therebetween to retain a volume of gas acting as a thermal insulator. This sleeve 37 is made from stainless steel and passes in sealed fashion on the one hand through the plate 11, and on the other hand has an end 38 in the form of a screw tip which screws into a thread of the fixed plate 1. The sealing at the lower level is ensured by this threading whilst at the upper level an appropriate sealing joint is placed between the plate 11 and a gripping plate 38a fixed by tension pieces 39 to the plate 11. It is understood that the disposition of the liquid nitrogen injector permits, if its radial position is wisely chosen, that a very substantial part, i.e. practically all the nitrogen vapors, which are developed immediately in the zone 30, are directed radially downstream toward the periphery, i.e. toward the exterior toothed annulus 31 whilst a very small part, i.e. a quite negligible part, is directed radially upstream toward the interior toothed annulus 32. An effect of reduction of the elevation of temperature resulting from intense friction effects and shearing carried out by the teeth on the rubber is therefore produced over the entire radial area downstream of the injector. The liquid nitrogen introduction area 30 should advantageously be chosen in the immediate neighborhood of the area where this temperature is highest (without intervention of liquid nitrogen) but also at an area such that a predominant flow of the gaseous flux is obtained radially downstream.

Experiments carried out have shown that excellent results are obtained by injecting a quantity of liquid nitrogen which is of the order of 0.3 liter per kilogram of processed rubber in a single injection. Advantageously a certain depression is maintained at the output of the grinder, for example a depression of 0.018 bar (0.018 $10^{-5}$ pa) which again favors flowing downstream of the nitrogen vapors.

The invention is applied basically to the grinding of used rubber and enables its re-utilization for all purposes and in particular for new vulcanization operations.

We claim:

1. In a grinding apparatus comprising two toothed grinding plates cooperating face to face, one of which plates is fixed and the other of which is rotatable, with an axial supply chamber across said fixed plate and at least one injector extending through said fixed plate and emerging facing said rotating plate mounted in an intermediate radial position, and a horizontal plate secured to and disposed above said fixed plate to define between said fixed and horizontal plates a horizontally flat annular chamber for cooling water; the improvement in which said injector is a liquid nitrogen injector which comprises a tube surrounded by and radially spaced from a thermal insulating sleeve, said sleeve extending vertically from said horizontal plate to said fixed plate and said tube passing down through said horizontal plate and fixed plate to deliver liquid nitrogen between said fixed and horizontal plates.

2. Grinding apparatus according to claim 1, in which said fixed plate is associated with an annular chamber for cooling by water circulation, wherein said liquid nitrogen injector passes through the said chamber and is mounted in sealed manner in a wall of said chamber and by its end in said fixed plate.

3. Grinding apparatus according to claim 1, and means for supplying water radially outwardly to said rotating plate to cool said plate during the grinding process and thus minimize the consumption of nitrogen.

4. Grinding apparatus according to claim 3, and means for returning the last-named water radially inwardly of said rotating plate.

* * * * *